United States Patent [19]
Bard et al.

[11] Patent Number: 5,921,572
[45] Date of Patent: Jul. 13, 1999

[54] CONTINUOUSLY COMPENSATING BICYCLE SUSPENSION SYSTEM

[75] Inventors: Aaron E. Bard, Highland; David Ross, IV, Bethesda, both of Md.

[73] Assignee: Outback Bicycles, Inc., Rockville, Md.

[21] Appl. No.: 08/903,916

[22] Filed: Jul. 31, 1997

[51] Int. Cl.$^6$ ................................................ B60G 17/015
[52] U.S. Cl. ........................................ 280/284; 280/5.515
[58] Field of Search .................................. 280/283, 284, 280/285, 281.1, 5.515, 5.519, 275, 276, 277, 286; 180/219, 227

[56] References Cited

U.S. PATENT DOCUMENTS

| | | | |
|---|---|---|---|
| Re. 34,628 | 6/1994 | Fujishiro et al. | 280/707 |
| 3,606,365 | 9/1971 | Strong | 280/6 H |
| 4,402,527 | 9/1983 | Kakehi et al. | 280/707 |
| 4,468,050 | 8/1984 | Woods et al. | 280/707 |
| 4,506,909 | 3/1985 | Nakashima et al. | 280/5.515 |
| 4,572,317 | 2/1986 | Isono et al. | 180/227 |
| 4,679,811 | 7/1987 | Shuler et al. | 280/284 |
| 4,766,982 | 8/1988 | Hayashi et al. | 188/181 |
| 4,989,148 | 1/1991 | Gurke et al. | 280/5.515 |
| 5,152,547 | 10/1992 | Davis | 280/5.515 |
| 5,320,375 | 6/1994 | Reeves et al. | 280/284 |
| 5,428,533 | 6/1995 | Ogawa | 280/5.515 |
| 5,452,910 | 9/1995 | Harris | 280/284 |
| 5,532,921 | 7/1996 | Katsuda et al. | 364/424.05 |
| 5,608,630 | 3/1997 | Poelovev | 364/424.04 |

*Primary Examiner*—Kevin Hurley
*Attorney, Agent, or Firm*—Akin, Gump, Strauss, Hauer & Feld, L.L.P.

[57] ABSTRACT

An electronically controlled suspension apparatus is provided for manipulating the spring constant of a bicycle rear wheel suspension system. The suspension apparatus includes a gas shock absorber connected to an external fluid chamber via a discharge loop and a return loop. The two loops control the volume of gas in communication between the shock absorber and the fluid chamber. The discharge loop includes a fluid control valve and a flow rate control valve. The return loop includes an one-way check valve and a flow rate control valve. The present invention also includes a sensor for measuring terrain induced accelerations of the rear wheel and an electronic circuit for operating the fluid control valve.

9 Claims, 8 Drawing Sheets

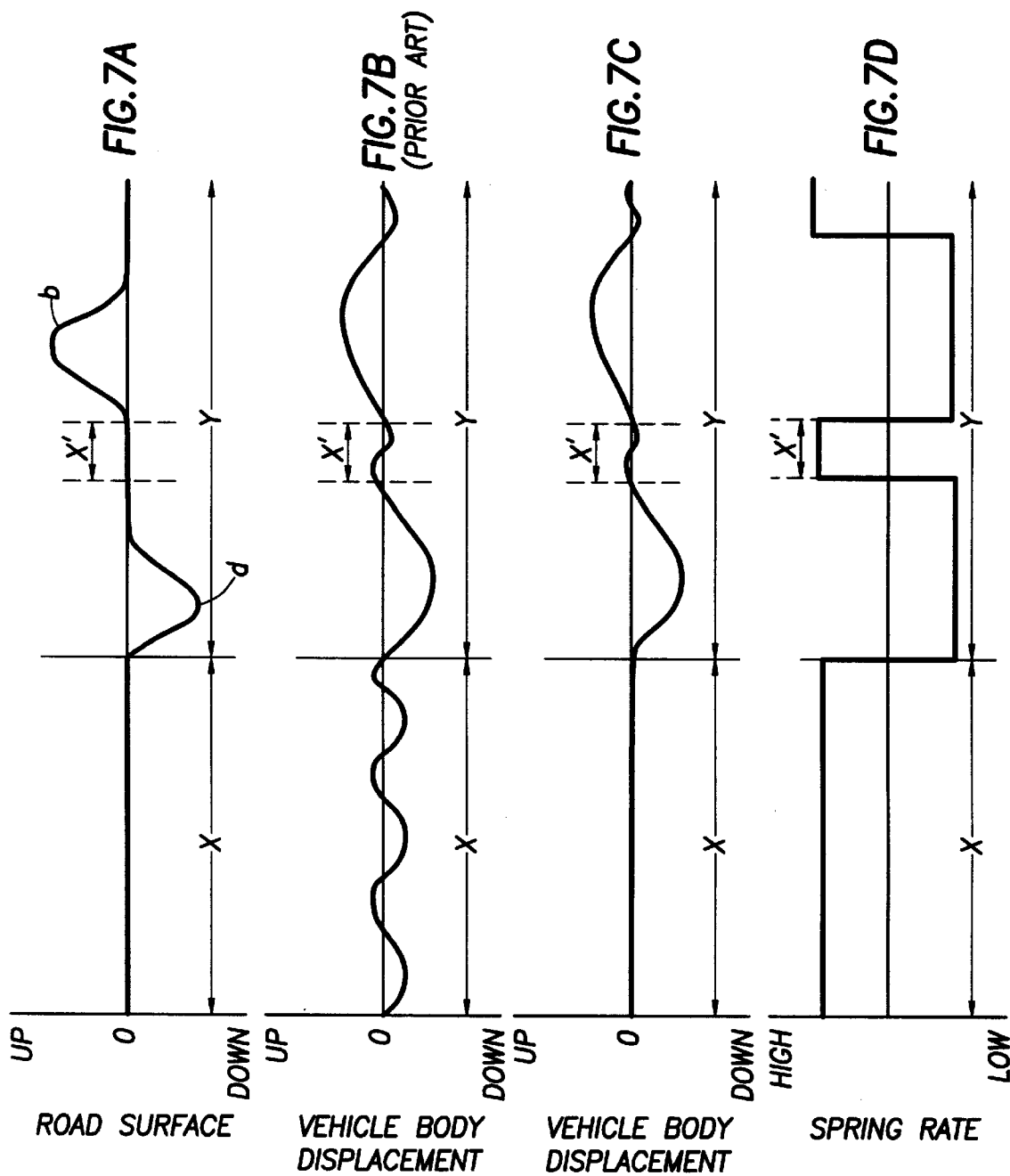

CONTINUOUSLY COMPENSATING BICYCLE SUSPENSION SYSTEM

BACKGROUND OF THE INVENTION

1. Field of the Invention

The present invention relates generally to a rear wheel suspension of a bicycle. In particular, the present invention relates to an electronically controlled suspension apparatus which absorbs forces caused by terrain without dissipating a rider's pedaling energy.

2. Description of the Prior Art

The pastime of bicycle riding has grown enormously over the last several years with the advent of a new species of bicycle commonly referred to as a Mountain Bike or an All-Terrain Bike ("ATB"). Because of its sturdy construction, rigid frame, wide tires, and stable ride, casual riders are often seen pedaling ATBs on city and suburban streets. One of the primary advantages and attractions of ATBs, however, is its ability to be operated off-road on rustic trails. Because of the ATB's rigid frame and wide tires, riders can be heard screaming down mountain paths and seen jumping and riding over rocks, streams, and fallen trees.

Whether riding on surface streets or mountain trails, ATB riders seek the most comfortable possible ride from their bicycle. In general, ATBs with rigid frames rely on wide tires and a small amount of natural flexibility in the frame and front forks to absorb the bumps and dips encountered on roads and trails. Often, the natural flexibility and tires provide sufficient shock absorption for riding over irregular pavement. The severe terrain of off-road riding, however, requires something more than frame flexing to smooth the ride.

In an effort to lessen the wear and tear on an ATB rider, wheel suspension systems have developed to dampen the transmission of terrain-induced shocks and vibrations to the rider. Typically, these suspension systems use a spring to support the sprung mass (i.e., the rider and bicycle frame above the spring) and a damper to control the rate of suspension movement. Many of these wheel suspension systems use an air-oil system for their suspension. In such systems, the oil is used as the damper and the air is used as the spring.

Although a bicycle having a rear wheel suspension system has a smoother ride as compared to simple frame dampening, it has created other problems for the rider. For example, unlike on most other types of vehicles where only the road surface causes the suspension to compress, on a bicycle two forces cause the rear wheel suspension to compress: the road surface or terrain and the rider's body (or mass) movement during pedaling. As a result, the suspension absorbs the forces imparted by the terrain but it also dissipates the pedaling forces imparted by the rider. Thus, in situations when a rider exerts maximum effort, such as during accelerations or hill climbs, the rear wheel suspension detracts from the rider's performance because the suspension reacts to the force of the rider's efforts and absorbs energy desirably directed into driving the rear wheel.

SUMMARY OF THE INVENTION

The present invention provides an electronically controlled suspension apparatus for manipulating the spring constant of a bicycle rear wheel suspension system in response to terrain induced accelerations but not in response to the downward forces of the rider's mass. In general, the ATB rider desires the spring constant of the suspension system to be very low so that when the rider hits a bump or dip, the suspension system absorbs the forces imparted by the terrain. By contrast, the rider also wants the spring constant to be very high during pedaling so that the rider's efforts translate efficiently into rotational energy of the back wheel.

The suspension apparatus of this invention is provided to control the spring constant of an air spring (more generally, "gas spring") suspension system such that it absorbs the forces imparted by the terrain without dissipating the rider's pedaling energy. In general, the spring constant of the gas spring system is manipulated by altering the volume of gas within a gas shock absorber. The suspension apparatus is versatile because it can be used on any rear suspension bicycle which uses a gas shock absorber. Moreover, the suspension apparatus conveniently installs onto an existing gas shock absorber.

The electronically controlled suspension apparatus according to the present invention includes a bicycle having a gas shock absorber for suspending or supporting the sprung mass. The shock absorber is connected via a discharge loop to an exterior fluid chamber which can receive the shock absorber gas when the shock absorber is compressed by the terrain. A sensor, attached to the bicycle frame near the rear wheel, measures the accelerations of the wheel caused by the terrain. An electronic circuit determines whether the volume of gas within the shock absorber should be altered due to the terrain induced accelerations. The electronic circuit activates a fluid control valve, located between the shock absorber and the fluid chamber, to permit gas flow from the shock absorber to the fluid chamber, resulting in a decrease in the spring constant of the gas spring. A return loop is provided from the fluid chamber to the shock absorber to permit the gas to flow back to the shock absorber, resulting in a return to the shock absorber's original spring constant and original uncompressed configuration. Flow rate control valves located within both the discharge and return loops control the rate of change of the gas spring constant.

This description is intended as a summary only, with the preferred embodiment to be described in detail and the patent claims to represent the scope of patent coverage obtained.

BRIEF DESCRIPTION OF THE DRAWINGS

FIG. 7 is a graphical display of an example of the operation of the suspension control system of FIG. 2.

DETAILED DESCRIPTION OF PREFERRED EMBODIMENT

Figure 1:
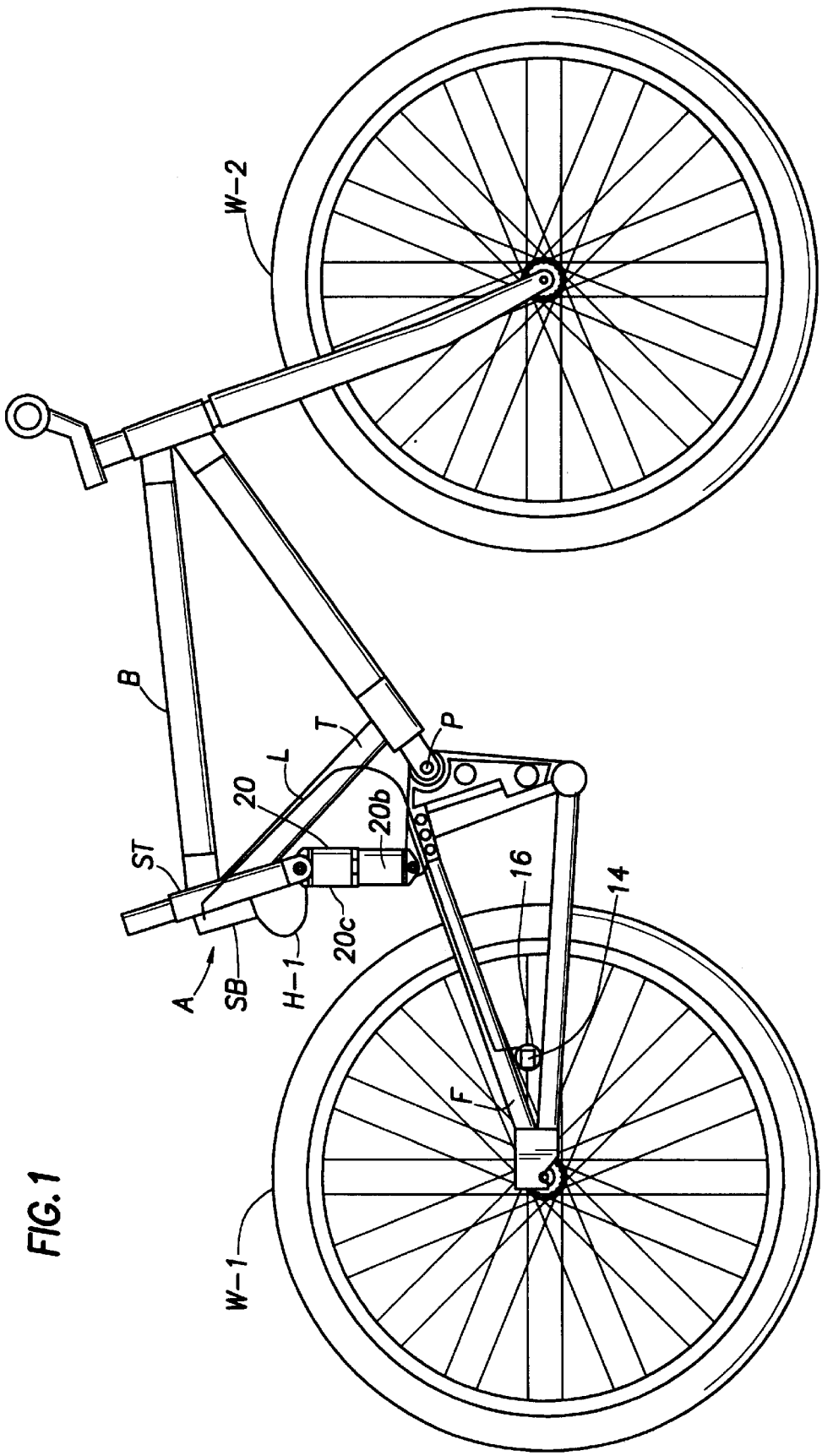
FIG. 1 is a side elevational view of a typical installation of the bicycle of the present invention with a suspension control system.

Referring to the drawings and in particular to FIG. 1, a bicycle B is illustrated with a rear wheel suspension system.

Typically, the rear wheel suspension system includes an upper frame T connected to a lower frame F at a pivot P. Generally, a gas or an air shock absorber 20 supports the upper frame T and rider (not shown) and provides some structural rigidity to the connection of frame components T and F.

Without the apparatus of the present invention, a typical gas shock absorber compresses and rebounds with each bump in terrain and with each pedal stroke of the rider. As a result, the typical gas shock absorber not only absorbs the shocks of bumps and dips but it also absorbs the rider's energy for driving the bicycle's rear wheel. Further, in a typical gas shock absorber, the volume of gas for absorbing the forces imparted to the bicycle by the terrain is constrained by the physical size of the shock absorber's cylinder volume. Thus, the typical gas shock has a relatively fixed spring constant.

Figure 2:
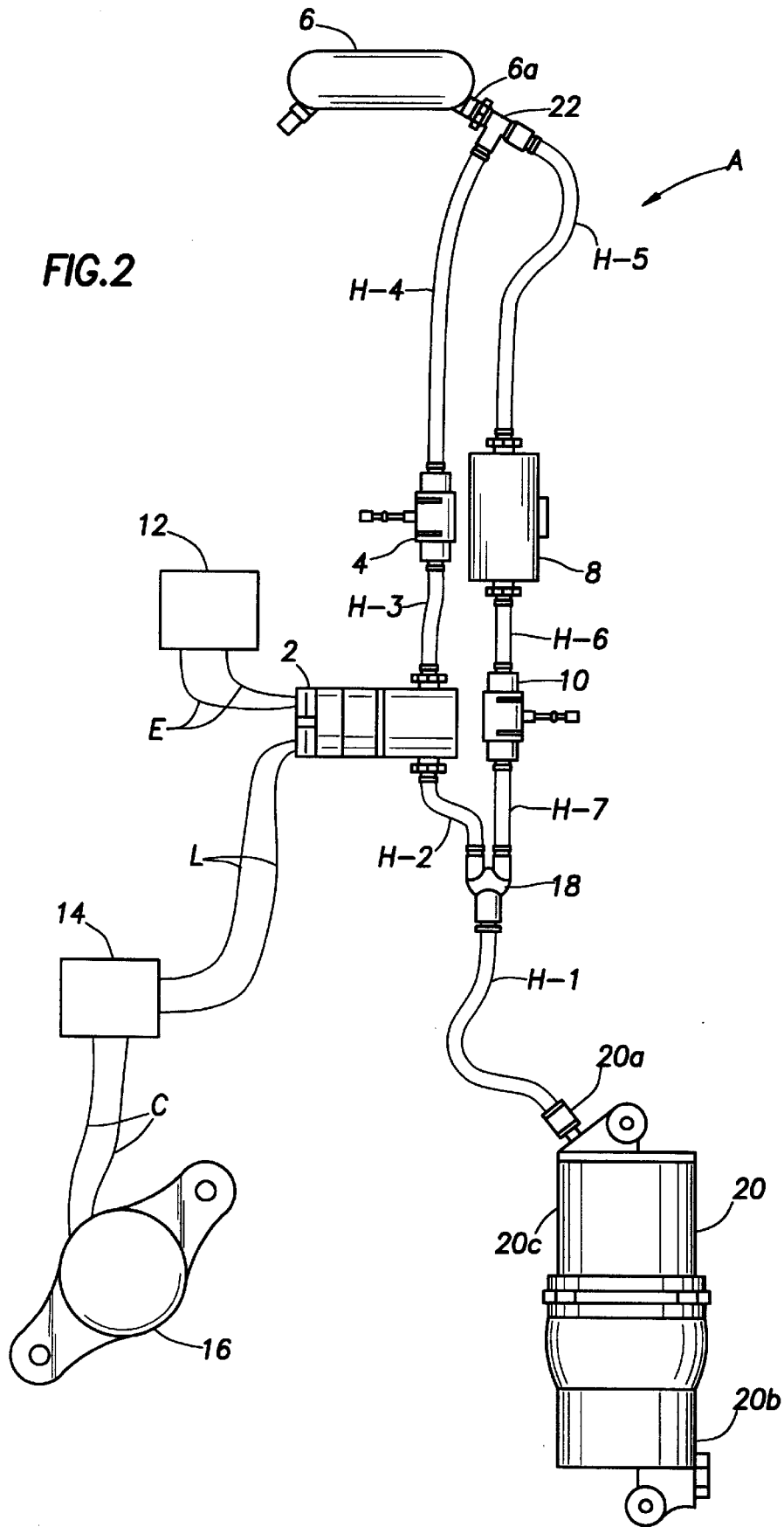
FIG. 2 is a plan view of the suspension control system.

By contrast, as shown in FIGS. 1 and 2, and described in greater detail below, the continuously compensating suspension apparatus A according to the present invention dramatically reduces rider induced compression of a gas shock absorber. Moreover, the present invention alters the spring constant of the gas shock by increasing the available volume of gas for compression by a piston within the shock absorber. In the present invention, the shock absorber 20 compresses only slightly due to the rider's movements but desirably compresses when a sensor or an accelerometer 16 detects an acceleration of the wheel W-1 due to a change in the terrain. When an acceleration is measured, an electronic circuit or microprocessor 14 opens a fluid control valve or solenoid valve 2, resulting in an available volume of gas for compression than originally in the shock absorber 20 and gas flow from the shock absorber 20 to a fluid chamber 6. As detailed below, an increase in the available volume of gas for compression results in a change of the shock absorber 20 spring constant.

In general, a low spring constant is desirable when a bike encounters rough terrain because a less stiff spring transmits fewer vibrations to the rider. A high spring constant, however, is desirable while the rider is pedaling on smooth terrain because a stiffer spring transmits more of the rider's energy into rotating the rear wheel. In the present invention, the rider's movements and pedaling forces do not alter the spring constant nor compress the shock absorber 20 appreciably because the accelerometer 16 measures only accelerations or forces below the gas shock absorber 20 at the rear wheel W-1 and not those rider induced forces that typically occur above the shock absorber 20.

The present invention alters the spring constant of the gas spring or gas shock 20 so that terrain induced vibrations transmitted to the rider are minimized. In general, the spring constant is the degree of spring stiffness. The spring constant is important because it directly effects the restoring force of the spring and the absorption of terrain induced forces or vibrations. In a mechanical spring, the relationship between the restoring force and the spring constant is governed generally by the linear relationship $$F=Kd$$

where F is the restoring force, K is the spring constant, and d is the compression of the spring from its undeformed length. In a mechanical spring, K is a function of spring geometry and material.

By contrast, the restoring force $F_R$ and the force transmitted to the rider $F_T$ of a gas spring or gas shock is governed by the pressure increase within the cylinder of the shock absorber due to the compression of the piston. In the present invention, the characteristics of the gas approximate that of an ideal gas so the pressure within the cylinder can be determined by referring to the ideal gas law $$PV=nRT$$

where P is the pressure within the cylinder, V is the volume within the cylinder, n is the number of moles of gas molecules within the cylinder, R is the ideal gas constant, and T is the temperature within the cylinder. Because n is constant in a closed system and the temperature does not change appreciably during compression by the piston, the relationship between pressure and volume can be simplified to $$P=C/V$$

where C is a constant equal to nRT. Thus, the restoration force $F_R$ and the force transmitted to the rider $F_T$ (F=PA, where A is the area of the piston) of the gas shock are inversely proportional to the volume V of the gas in the cylinder (F=C/AV). Moreover, if the spring constant $K_S$=C/AV then an increase the gas volume V will decrease the spring constant $K_S$. As described in greater detail below, the present invention alters the transmitted force $F_T$ ($F_T$=C/AV) and the spring constant $K_S$ by changing the volume V of gas available for compression within the gas shock absorber 20.

Referring to FIG. 2, the suspension apparatus A of the present invention includes the gas shock absorber 20 connected to the external fluid chamber 6 via a discharge loop and a return loop. The two loops control the volume and flow rate of the gas between shock absorber 20 and the fluid chamber 6. The discharge loop includes hose segments H-1 through H-4, a fluid control valve or solenoid valve 2, and a flow rate control valve 4. Similarly, the return loop includes hose segments H-5 through H-7 and H-1, an one-way check valve 8, and a flow rate control valve 10. Additionally, the present invention includes a sensor or accelerometer 16 for measuring terrain induced accelerations of the rear wheel W-1, an electronic circuit or a microprocessor 14 for operating the solenoid valve 2, and a power supply 12 for electrical power.

Figure 3:
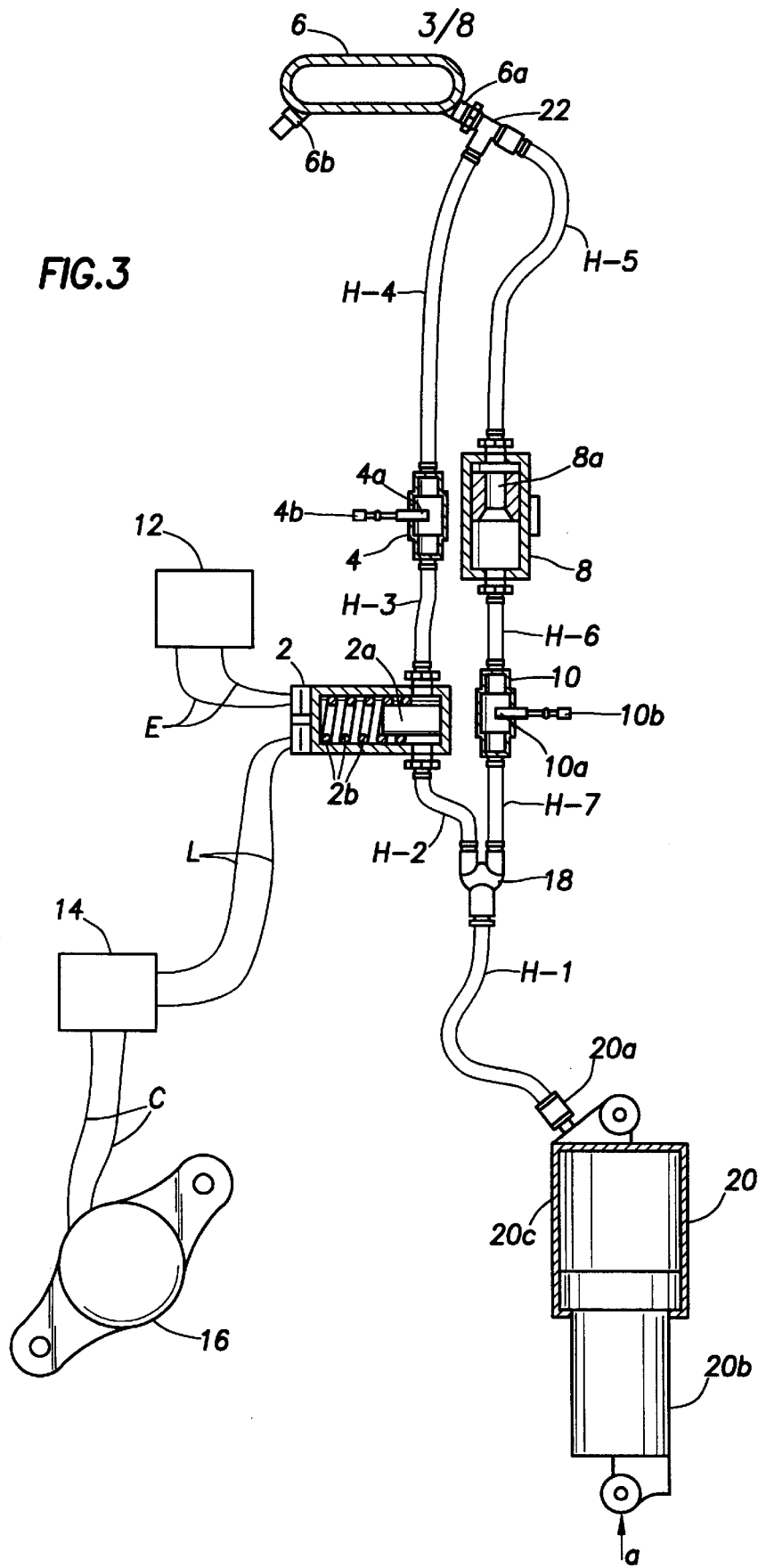
FIG. 3 is a plan view, partially in section, of the suspension control system of FIG. 2.
Figure 4:
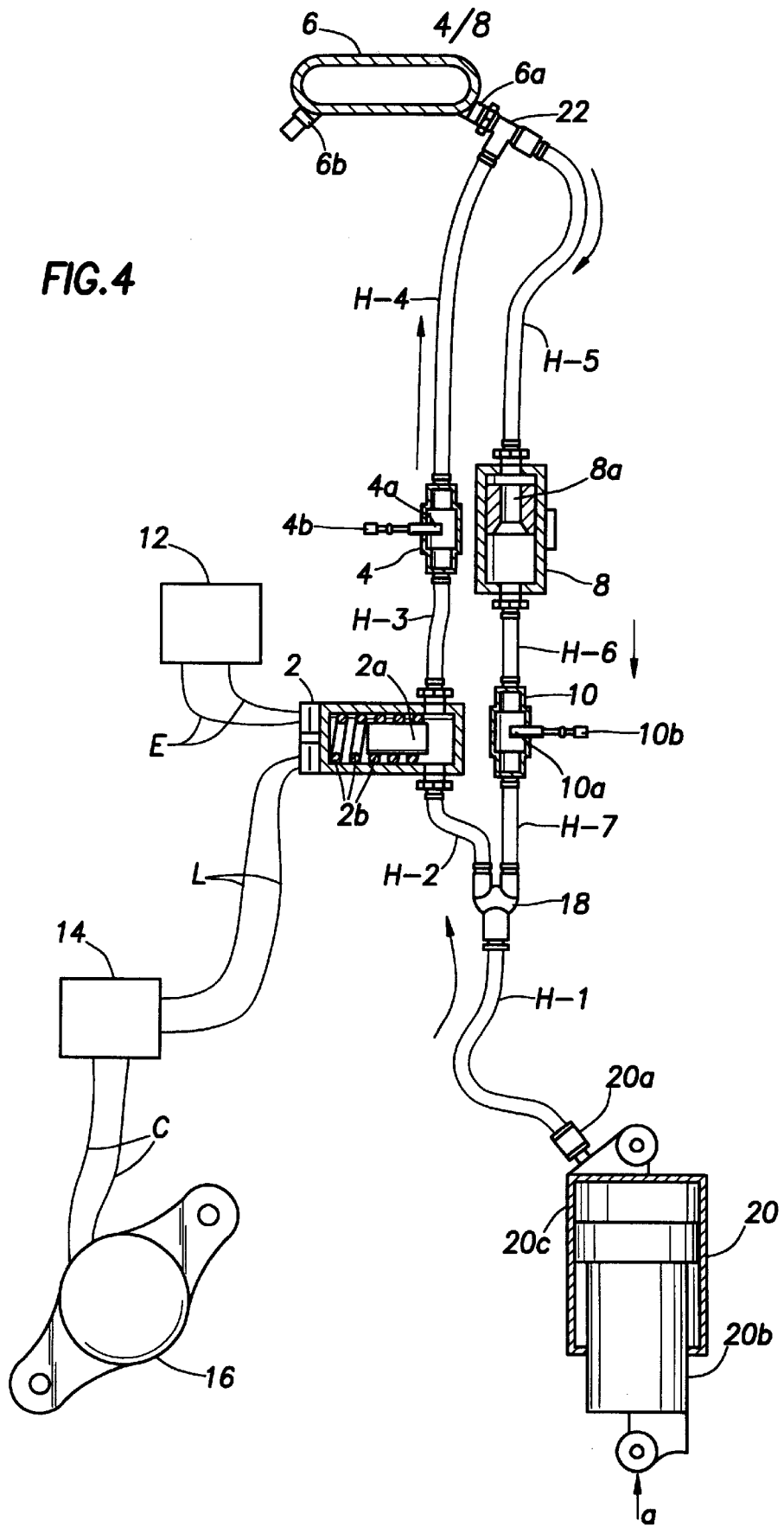
FIG. 4 is a plan view, partially in section, of the suspension control system of FIG. 2.

In general, the present invention reduces the terrain induced accelerations transmitted to the rider by altering the available volume of gas for compression by the shock absorber 20. Referring to FIG. 2, prior to the bicycle B hitting a bump, the shock absorber 20 and component parts of the discharge and return loops are under equal pressure $P_1$. Generally, the pressure $P_1$ within the shock absorber 20 is greater than a typical as shock absorber. Typically, the pressure $P_1$ is sufficient to virtually eliminate any compression of the shock absorber 20 by the rider. Referring to FIGS. 3 and 4, when the bicycle B hits a bump, the accelerometer 16 measures the acceleration a and transmits an output signal to the electronic circuit 14. Because the shock absorber 20 reacts to the forces imparted by the bump, a piston 20b compresses the gas within cylinder 20c, increasing the pressure within the shock absorber 20 to $P_2$. If the acceleration a detected by the accelerometer 16 differs from 1-g (the unit of force exerted by gravity), the electronic circuit 14 actuates the solenoid valve 2 to an open position.

When the solenoid valve 2 is opened, two events occur. First, the volume of gas available for compression by the piston 20b increases by the volume of gas within the components of the discharge and return loops. Because the terrain induced forces transmitted to the rider are governed by the relationship $F_T$=C/AV, this increase in gas volume decreases the reduces the forces transmitted to the rider. Similarly, because $K_S=C/AV$ governs the relationship between volume V and spring constant $K_S$, an increase in gas volume decreases the spring constant $K_S$. Thus, if the volume of gas within the components of the discharge and return loops is equal to that originally in the cylinder 20c, the force transmitted to the rider is decreased by a factor of two.

Second, because the acceleration a causes an increase in the pressure within the shock absorber 20 to $P_2$, gas begins to flow toward the components of the return and discharge loops, which both contain gas under less pressure $P_1$. As shown by the arrows in FIG. 4, because the one-way check valve 8 prohibits gas flow from the shock absorber 20 to the fluid chamber 6, gas flows through the discharge loop from the shock absorber 20 to the fluid chamber 6.

In general, because of the forces imparted by the bump on the suspension system, the pressures within the shock absorber 20 and the fluid chamber 6 are now greater than before the rider hit the bump. Once the rider has passed over the bump and the accelerometer 16 no longer senses the acceleration a, the solenoid valve 2 closes (FIG. 3), thus preventing gas flow from the shock absorber 20 to the fluid chamber 6. At this point, because the gas flow is within a closed system, the shock absorber 20 begins to rebound because the pressure within the fluid chamber 6 (now $P_2$) is greater than the pressure within the shock absorber 20 (now $P_1$). Thus, gas flows through the return loop to the shock absorber 20 until the pressure within the system and shock absorber 20 returns to the pre-bump pressure $P_1$.

As shown in FIG. 1, the shock absorber 20 is mounted to the upper frame T and the lower frame F. Generally, the components of the discharge and return loops, as well as the power supply 12, are contained within a saddle bag SB secured to a seat tube ST. The accelerometer 16 and electronic circuit 14, however, are mounted to the lower frame F near the wheel W-1.

In the preferred embodiment, the shock absorber 20 includes a gas or fluid that acts according to the ideal gas law and the pressure-volume relationship $P=C/V$. A typical gas shock used in the present invention is model number ALPS4R manufactured by Fox Factory Racing.

As shown in FIGS. 2–4, the shock absorber 20 includes the cylinder 20c for holding a volume of gas and the piston 20b for compressing the gas within the cylinder 20c. Referring to FIG. 1, the piston 20b is pivotally connected to the lower frame F and the cylinder 20c is pivotally connected to the upper frame T. As a result, the piston 20b can compress the gas within the cylinder 20c when the rear wheel W-1 rolls over rough terrain because the terrain exerts a force on the lower frame F which then rotates about the pivot P toward the upper frame T.

As shown in FIGS. 2–4, the cylinder 20c of the shock absorber 20 includes a port 20a for adding and removing gas from the cylinder 20c. Without use of the present invention, the port 20a is used primarily for adding gas to the cylinder 20c after an appreciable amount has naturally leaked to the surroundings. In the present invention, however, the discharge loop and the return loop are attached to port 20a though a hose or conduit such as hose H-1. Alternatively, a gas shock may include two ports and, in such a case, the discharge loop and the return loop would each be connected to their own port. When gas is permitted to communicate between the shock absorber 20 and the fluid chamber 6 and only one port is present on the shock absorber 20, the gas flow within hose H-1 is directed by a hose splitter 18 toward the solenoid valve 2 of the discharge loop because the one-way check valve 8 prevents gas flow into the return loop.

When the electronic circuit 14 (discussed below) energizes the solenoid valve 2, the solenoid valve 2 opens, permitting gas to communicate between cylinder 20c and the fluid chamber 6. By contrast, when the electronic circuit 14 no longer energizes the solenoid valve 2, it closes and prevents gas from flowing. A typical solenoid valve used in the present invention is a 3000 series model manufactured by Honeywell. As shown in FIGS. 3 and 4, the solenoid valve 2 includes a valve 2a and a set of coils 2b. As shown in FIG. 3, when the coils 2b are not energized, the valve 2a remains closed. FIG. 4 shows the coils 2b in their energized state and the valve 2a in its open position. Unless the gas shock contains more than one port 20a, the gas flow into solenoid valve 2 is through a conduit or hose H-2 connected to the hose splitter 18. Also, the power supply 12 provides electricity through lines E to the solenoid valve 2 so that the coils 2b can be energized at the desired time.

Figure 6A:
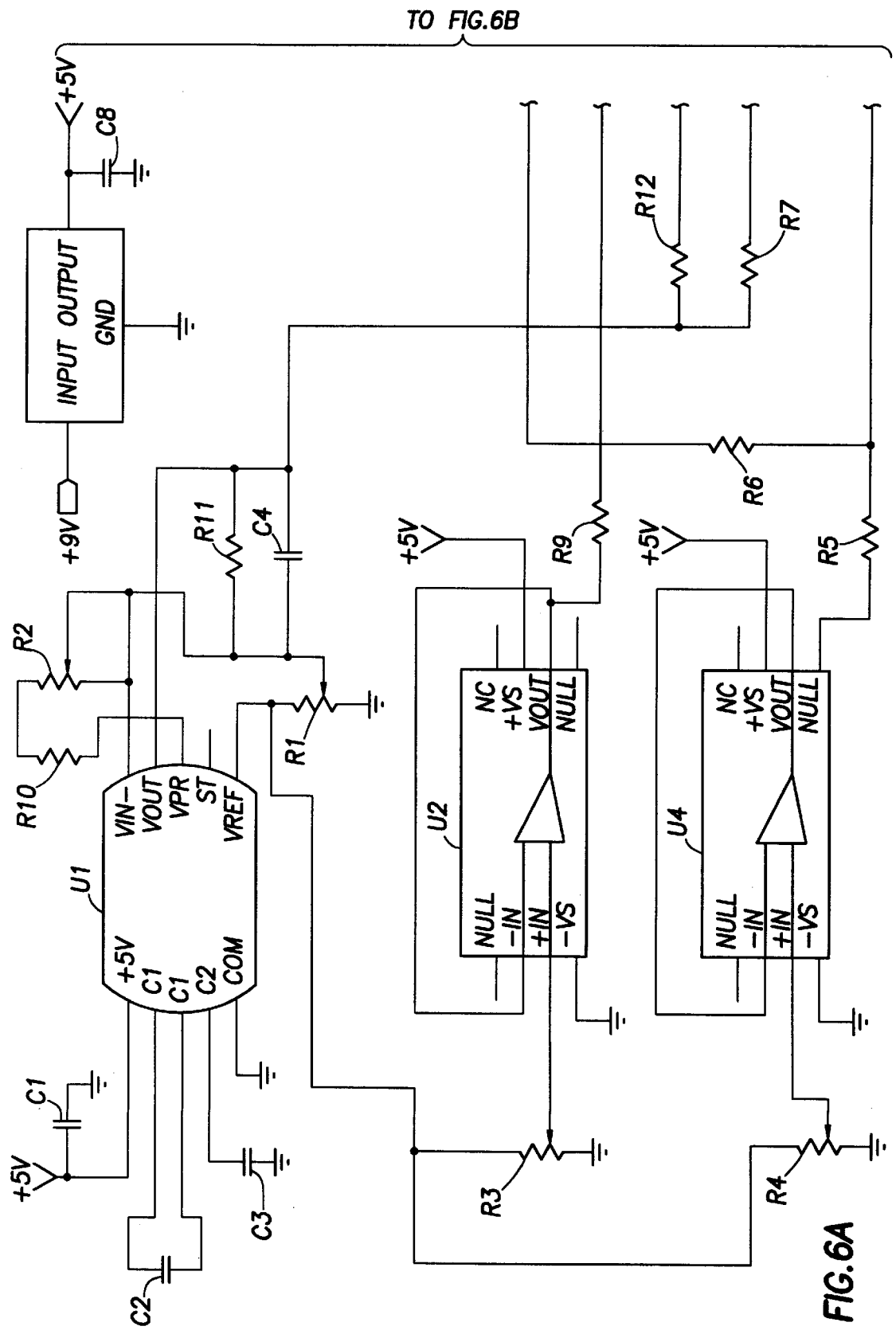
FIG. 6 is an electrical circuit diagram of the sensor and electronic circuit of FIG. 5.
Figure 6B:
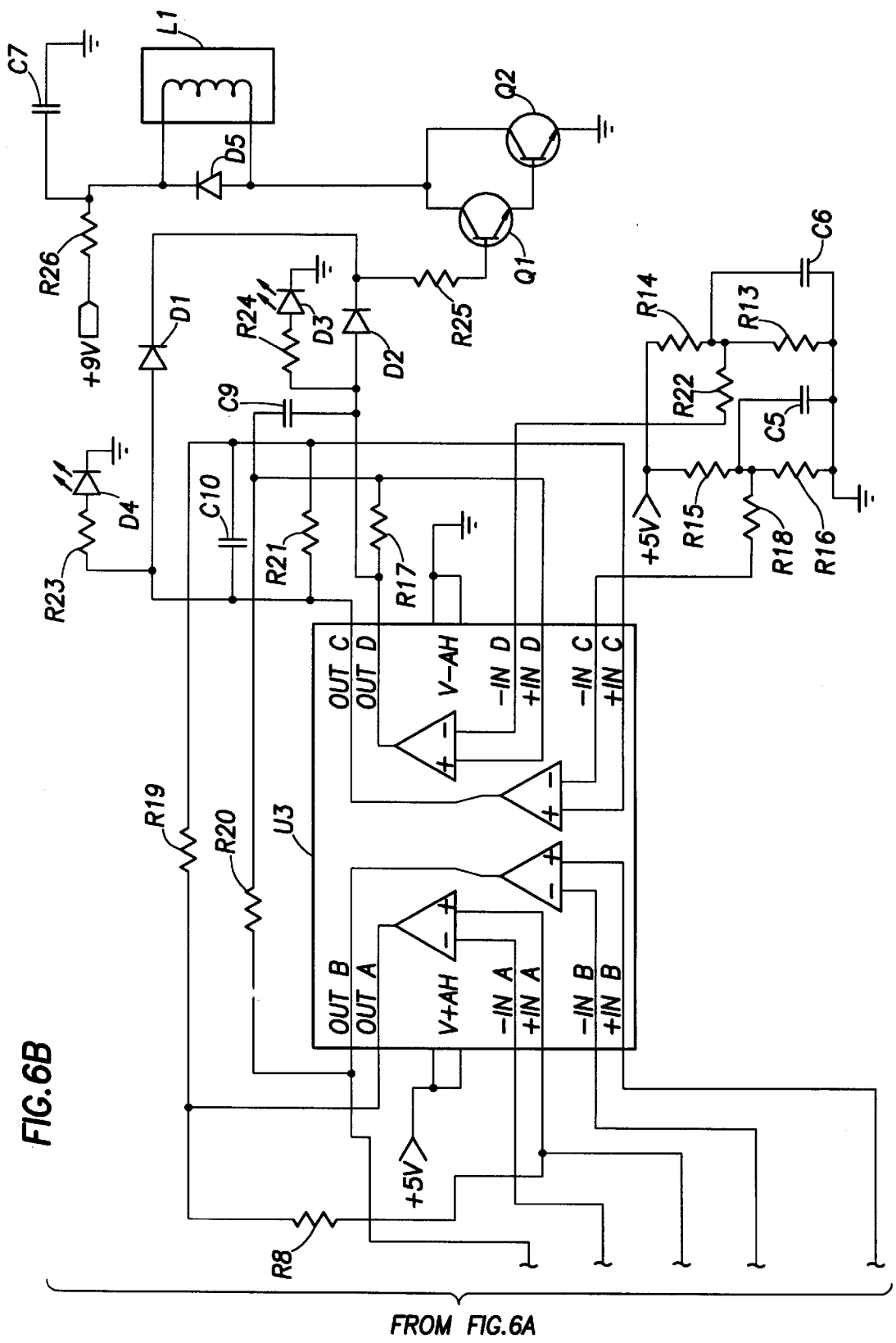

As shown in FIG. 1, the accelerometer 16 is mounted on the lower frame F near the rear wheel W-1 (collectively, the "unsprung mass"). The accelerometer 16 only measures accelerations of the rear wheel W-1 caused by the changes in terrain and transmits the measured accelerations to the electronic circuit 14. Because the accelerometer 16 is mounted to the unsprung mass rather than the sprung mass (the remainder of the bike mass above the shock absorber 20, including the rider), the accelerometer 16 does not measure accelerations induced by the rider and thus does not send a signal indicating an acceleration to the electronic circuit 14. As shown in the electrical circuit diagram of FIG. 6, a typical accelerometer used in the present invention is model number XL05 manufactured by Analog Devices.

Figure 5:
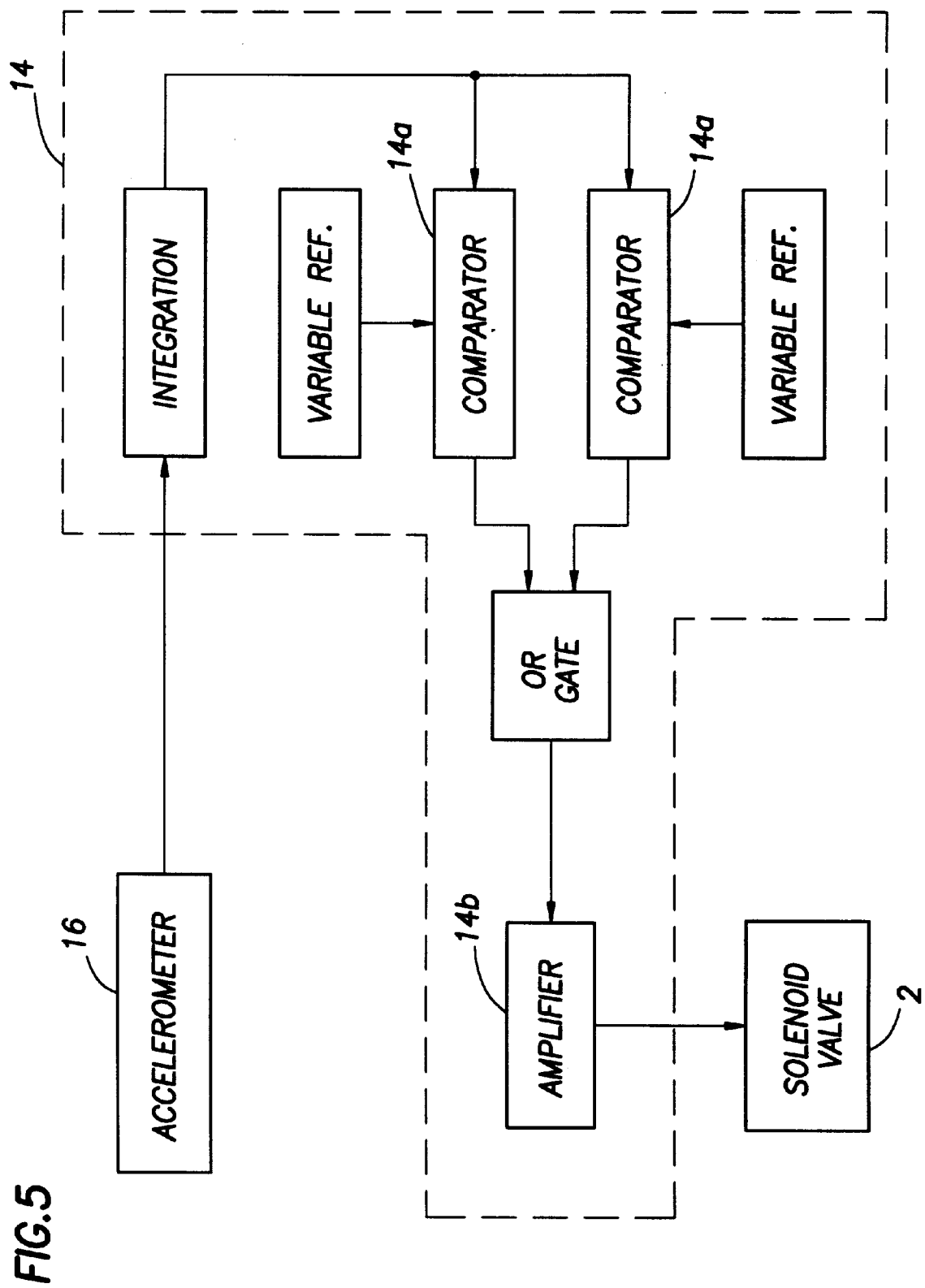
FIG. 5 is a flow diagram of a sensor and an electronic circuit utilized in the present invention.

Referring to FIGS. 1 and 2, the electronic circuit 14 can be mounted near the accelerometer 16 and the two communicate through standard communication means, such as wires C. In general, as shown in the flow diagram of FIG. 5 and the electrical circuit diagram of FIG. 6, the accelerometer 16 senses road conditions and transmits its measurements to a comparator 14a. The comparator 14a compares the measurements to a variable reference acceleration and determines whether the solenoid valve 2 should be opened or closed. If the comparator 14a determines that the bump in the terrain warrants opening the solenoid valve 2 then an amplifier 14b transmits a signal over communication lines, such as lines L, to the solenoid valve 2. Typically, the comparator 14a will signal the solenoid valve 2 to open when the accelerometer measures accelerations different from 1-g. Once the accelerometer 16 stops sending a signal to the comparator 14a regarding terrain induced accelerations, the amplifier ceases to energize the coils 2b of the solenoid valve 2 and the valve 2a closes.

As shown in FIGS. 2–4, the flow rate control valve 4, inserted between the solenoid valve 2 and the fluid chamber 6, controls the rate at which the gas flows from the shock absorber 20 to the fluid chamber 6. A typical flow rate control valve 4 used in the present invention is a 5/32" model manufactured by Llegris which includes an adjustable valve 4a. The valve 4a can be opened or closed easily by the rider rotating stem 4b. By adjusting the valve 4a, the rider can control the rate of change of the spring constant of the air shock 20. Typically, a hose H-3 or other conduit connects the solenoid valve 2 to the control valve 4.

The fluid chamber 6 provides an enclosed cavity for receiving gas from the compressed shock absorber 20. When the solenoid valve 2 is opened, the fluid chamber 6 receives gas through the port 6a from the shock absorber 20. Thus, the pressure increases within the fluid chamber 6 to $P_2$. When the solenoid valve 2 closes, the pressure within the fluid chamber 6 returns to its original, $P_1$, state by expelling the gas through the same port 6a. Typically, gas enters the fluid chamber 6 from the control valve 4 through hose H-4 and hose splitter 22 and exits through hose splitter 22 and hose H-5 of the return loop. The fluid chamber 6 also includes a second port 6b for introducing additional gas into the system after an appreciable amount has naturally leaked to the surroundings.

The one-way check valve 8 prohibits the gas from flowing from the shock absorber 20 to the fluid chamber 6 along the return loop. The check valve 8 includes a valve 8a that opens only when the pressure within the fluid chamber 6 is greater than the pressure within the shock absorber 20. Therefore, if the pressure is greater on the shock absorber 20 side of the check valve 8, the valve will not open and gas will flow through the opened solenoid valve 2. A typical one-way check valve 8 used in the present invention is model number 80184344 manufactured by ARO. A hose H-5 or other conduit connects the check valve 8 to the hose splitter 22.

As shown in FIGS. 2–4, the flow rate control valve 10, inserted between the one-way check valve 8 and the shock absorber 20, controls the rate at which gas flows from the fluid chamber 6 to the shock absorber 20. The control valve 10 is identical to control valve 4 described above. With the control valve 10, the rider can adjust how quickly the shock absorber 20 rebounds to its original state. In the present invention, hoses H-6 and H-7 connect the control valve 10 to the one-way check valve 8 and the hose splitter 18, respectively.

FIGS. 7A–7D provide a graphical display of how the rider and the terrain effect the movement of the rear wheel suspension system of a bicycle both with and without the present invention. FIG. 7A represents a simulated road surface with segments X and X' simulating a smooth surface and segment Y simulating a dip d and a bump b. In general, these segments can be used to model any terrain surface.

FIG. 7B represents the movement or displacement of the suspended portion of a prior art bicycle (or its sprung mass) while the bicycle moves over the individual elements of FIG. 7A. Segments X and X' represent rider induced suspension movements on a smooth surface. This suspension motion is caused by the natural shifting of the rider's weight during pedaling. This motion is undesirable because the suspension system is absorbing energy from the rider. Segment Y shows the suspension movement caused by the dip d and the bump b, as well as the suspension movements caused by the rider. The suspension movement caused by the terrain is much greater in magnitude than that caused by the rider. The suspension movement during the dip d and the bump b, however, is desirable because the suspension absorbs the shock caused by the terrain.

FIG. 7C represents the sprung mass displacement when the present invention is applied to a suspension system. By contrast to the segments X and X' of FIG. 7B, segments X and X' of FIG. 7C show minimal suspension movement because the accelerometer 16 does not detect a ground induced vibration. As a result, the shock absorber 20 of the suspension does not compress and rebound. In segment Y of FIG. 7C, the suspension acts very similarly to segment Y of FIG. 7C because the terrain vibrations cause the accelerometer 16 and the electronic circuit 14 to operate the solenoid valve 2, permitting the shock absorber 20 to compress and rebound.

FIG. 7D represents the spring constant or dampening of the shock absorber 20 of the present invention. In segments X and X', the spring constant or damping is very high to reduce suspension movement due to rider induced vibrations. In segment B, the spring constant or damping is greatly reduced due to the solenoid valve 2 permitting the shock absorber 20 to compress and rebound.

The foregoing disclosure and description of the invention is illustrative and explanatory thereof, and various changes in the size, shape, and materials as well as in the details of illustrative construction and assembly, may be made without departing from the spirit of the invention.

What is claimed is:

1. A bicycle having a suspension control apparatus comprising:

a shock absorber having a fluid for damping vibrations and a shock port for receiving and remitting said fluid;

a return loop and a discharge loop in fluid communication with said shock port;

a fluid chamber having a port adapted for receiving and remitting said fluid of said shock absorber, said fluid chamber port being in fluid connection with said return and discharge loops, said fluid chamber port receiving said fluid through said discharge loop and remitting said fluid through said return loop;

a fluid control valve located within said discharge loop, said fluid control valve being adapted to operate in an open position for communication of said fluid to said fluid chamber from said shock absorber and in a closed position for inhibiting said communication;

a check valve located within said return loop, said check valve being adapted to permit flow of said fluid to said shock absorber from said fluid chamber;

a sensor for monitoring accelerations of a bicycle wheel assembly and for producing a sensor signal indicative of said accelerations of said wheel assembly;

an electronic circuit for receiving said sensor signal and transmitting a control signal to said fluid control valve, said control signal causing said fluid control valve to operate in either said open position or said closed position; and a first flow rate control valve located within said discharge loop for controlling a first flow rate of said fluid from said shock absorber to said fluid chamber.

2. The suspension control apparatus of claim 1, further including:

a second flow rate control valve located within said return loop for controlling a second flow rate of said fluid from said fluid chamber to said shock absorber.

3. A suspension control apparatus for a bicycle comprising:

a shock absorber having a fluid for damping vibrations and a shock port for receiving and remitting said fluid;

a return loop and a discharge loop in fluid communication with said shock port;

a fluid chamber having a port adapted for receiving and remitting said fluid of said shock absorber, said fluid chamber port being in fluid connection with said return and discharge loops, said fluid chamber port receiving said fluid through said discharge loop and remitting said fluid through said return loop;

a fluid control valve located within said discharge loop, said fluid control valve being adapted to operate in an open position for communication of said fluid to said fluid chamber from said shock absorber and in a closed position for inhibiting said communication;

a check valve located within said return loop, said check valve being adapted to permit flow of said fluid to said shock absorber from said fluid chamber;

a sensor for monitoring accelerations of a bicycle wheel assembly and for producing a sensor signal indicative of said accelerations of said wheel assembly;

an electronic circuit for receiving said sensor signal and transmitting a control signal to said fluid control valve, said control signal causing said fluid control valve to operate in either said open position or said closed position; and a first flow rate control valve located within said discharge loop for controlling a first flow rate of said fluid from said shock absorber to said fluid chamber.

4. The suspension control apparatus of claim 3, further including:

a second flow rate control valve located within said return loop for controlling a second flow rate of said fluid from said fluid chamber to said shock absorber.

5. A suspension control apparatus for a bicycle having a shock absorber containing a fluid for damping vibrations and a shock port for receiving and remitting said fluid comprising:

a return loop and a discharge loop in fluid communication with said shock port;

a fluid chamber having a port adapted for receiving and remitting said fluid of said shock absorber, said fluid chamber port being in fluid connection with said return and discharge loops, said fluid chamber port receiving said fluid through said discharge loop and remitting said fluid through said return loop;

a fluid control valve located within said discharge loop, said fluid control valve being adapted to operate in an open position for communication of said fluid to said fluid chamber from said shock absorber and in a closed position for inhibiting said communication;

a check valve located within said return loop, said check valve being adapted to permit flow of said fluid to said shock absorber from said fluid chamber;

a sensor for monitoring accelerations of a bicycle wheel assembly and for producing a sensor signal indicative of said accelerations of said wheel assembly;

an electronic circuit for receiving said sensor signal and transmitting a control signal to said fluid control valve, said control signal causing said fluid control valve to operate in either said open position or said closed position; and a first flow rate control valve located within said discharge loop for controlling a first flow rate of said fluid from said shock absorber to said fluid chamber.

6. The suspension control apparatus of claim 5, further including:

a second flow rate control valve located within said return loop for controlling a second flow rate of said fluid from said fluid chamber to said shock absorber.

7. A bicycle having a suspension control apparatus comprising:

a shock absorber having a fluid for damping vibrations and a shock port for receiving and remitting said fluid;

a return loop and a discharge loop in fluid communication with said shock port;

a fluid chamber having a port adapted for receiving and remitting said fluid of said shock absorber, said fluid chamber port being in fluid connection with said return and discharge loops, said fluid chamber port receiving said fluid through said discharge loop and remitting said fluid through said return loop;

a fluid control valve located within said discharge loop, said fluid control valve being adapted to operate in an open position for communication of said fluid to said fluid chamber from said shock absorber and in a closed position for inhibiting said communication;

a check valve located within said return loop, said check valve being adapted to permit flow of said fluid to said shock absorber from said fluid chamber;

a sensor for monitoring accelerations of a bicycle wheel assembly and for producing a sensor signal indicative of said accelerations of said wheel assembly;

an electronic circuit for receiving said sensor signal and transmitting a control signal to said fluid control valve, said control signal causing said fluid control valve to operate in either said open position or said closed position; and a flow rate control valve located within said return loop for controlling a flow rate of said fluid from said fluid chamber to said shock absorber.

8. A suspension control apparatus for a bicycle comprising:

a shock absorber having a fluid for damping vibrations and a shock port for receiving and remitting said fluid;

a return loop and a discharge loop in fluid communication with said shock port;

a fluid chamber having a port adapted for receiving and remitting said fluid of said shock absorber, said fluid chamber port being in fluid connection with said return and discharge loops, said fluid chamber port receiving said fluid through said discharge loop and remitting said fluid through said return loop;

a fluid control valve located within said discharge loop, said fluid control valve being adapted to operate in an open position for communication of said fluid to said fluid chamber from said shock absorber and in a closed position for inhibiting said communication;

a check valve located within said return loop, said check valve being adapted to permit flow of said fluid to said shock absorber from said fluid chamber;

a sensor for monitoring accelerations of a bicycle wheel assembly and for producing a sensor signal indicative of said accelerations of said wheel assembly;

an electronic circuit for receiving said sensor signal and transmitting a control signal to said fluid control valve, said control signal causing said fluid control valve to operate in either said open position or said closed position; and a flow rate control valve located within said return loop for controlling a flow rate of said fluid from said fluid chamber to said shock absorber.

9. A suspension control apparatus for a bicycle having a shock absorber containing a fluid for damping vibrations and a shock port for receiving and remitting said fluid comprising:

a return loop and a discharge loop in fluid communication with said shock port;

a fluid chamber having a port adapted for receiving and remitting said fluid of said shock absorber, said fluid chamber port being in fluid connection with said return and discharge loops, said fluid chamber port receiving said fluid through said discharge loop and remitting said fluid through said return loop;

a fluid control valve located within said discharge loop, said fluid control valve being adapted to operate in an open position for communication of said fluid to said fluid chamber from said shock absorber and in a closed position for inhibiting said communication;

a check valve located within said return loop, said check valve being adapted to permit flow of said fluid to said shock absorber from said fluid chamber;

a sensor for monitoring accelerations of a bicycle wheel assembly and for producing a sensor signal indicative of said accelerations of said wheel assembly;

an electronic circuit for receiving said sensor signal and transmitting a control signal to said fluid control valve, said control signal causing said fluid control valve to operate in either said open position or said closed position; and a flow rate control valve located within said return loop for controlling a flow rate of said fluid from said fluid chamber to said shock absorber.

* * * * *